Patented May 8, 1928.

1,668,961

UNITED STATES PATENT OFFICE.

AUGUST E. HANSEN, OF NEW YORK, N. Y., AND ALBERT C. RUGER, OF WOLLASTON, MASSACHUSETTS.

PAPER-MILL SLUDGE COMPOSITION.

No Drawing. Substitute for application Serial No. 521,771, filed December 12, 1921. This application filed May 27, 1926. Serial No. 112,171.

This invention relates to paper sludge compositions and more particularly to such compositions containing rubber in its various forms.

In the manufacture of paper, and particularly in processes involving the reclamation of old paper, there is produced a considerable bulk of material usually called sludge, which mixed with large quantities of water, is allowed to run off from any or all of the mechanical equipment and tanks of paper mills. In the prior art, this watery sludge has been substantially a waste material, and accordingly has accumulated to such an extent that its disposition has become a serious problem. No commercial processes of utilizing this material have been found, so that in order to dispose of it, it has been allowed to accumulate in lagoons or basins where the sludge proper settled out. In this way very large quantities of the sludge proper have been, and are being accumulated.

One of the objects of this invention is to utilize this paper mill sludge or equivalent material in desirable compositions of matter having wide use.

Other and further objects and advantages of this invention will appear from the more detailed description set forth below, it being understood that various changes may be made in this disclosure by those skilled in the art, without departing from the spirit and scope of this invention.

In the utilization of this paper mill sludge, it may be employed of itself, or may be mixed with any of a number of binders or fillers. In such use, the settled material as it has accumulated in the lagoons may be used without further treatment, although if desired it may be purified as by washing or in any other desirable way. The material, either purified or not as desired, may then be compressed into a sheet or block, and used as such, or it may be used in powdered or shredded form.

Among the binders which have been found to be desirable additions when binders are used are the following: animal and vegetable glues; waxes; gums; resins, either natural or artificial; rubber; hydrocarbons and bitumens, and their derivatives and compounds; silicates; and colloids. Shellac and similar materials may be used also.

As fillers, there may be any of the usual mineral, vegetable, or animal fillers, and more particularly there are mentioned, cements, plaster of Paris, starch, etc., calcareous materials, silicates, etc. In giving these materials it is obvious that in some instances the binders may also act as fillers and vice versa. And further it will be apparent that in these compositions, the paper sludge may be considered as the filler for the other materials with which it is compounded.

In compounding the paper mill sludge with the selected fillers or binders or both, any ordinary method of combining them may be employed. For example in mixing the rubber containing compositions it is desirable to use the usual milling machine wherein the rubber is placed upon one of a pair of heated rolls, and the sludge, either in powdered, shredded, or compressed form added thereto. In this way homogeneous products are easily obtained. The resulting rubber sludge compositions have many properties different from those of ordinary rubber, and are therefore particularly adapted to a number of uses. For example the stretch of the composition is less than that of ordinary rubber, and the flexibility is also lower. These compositions are therefore peculiarly adapted to the manufacture of fabricated products such as boot heels and soles, steam hose, flooring, belting, and mechanical rubber goods of all descriptions.

In making these rubber containing compositions, rubber in any of its well known forms may be used, for example, latex, crude rubber, reclaimed rubber, rubber solution, and rubber gums such as caoutchouc, balata, and gutta percha. Since the sludge combines with the rubber very readily, it may be used in widely varying proportions. The proportions used will determine to a large extent the hardness or resiliency of the resulting product. For example, a product containing 25 per cent of rubber and 75 per cent of paper sludge produces a hard and stiff mixture. Increasing the proportion of rubber gives a softer product. For example a product containing 33⅓ per cent of rubber to 66⅔ per cent of paper mill sludge, is soft. For most uses it will be desirable to use a proportion of about 25 per cent of rubber to 75 per cent of paper mill sludge, and in order to avoid excessive brittleness on the one hand and extreme softness on the other, a proportion lying between 25 and 30 per cent of rubber based on the other materials entering into the composition will be found to be satisfactory. However, other proportions may also be used, and for some purposes these proportions may be varied widely. Compositions containing from 25 to 75 per cent of rubber to from 75 to 25 per cent of paper mill sludge have proved advantageous.

Other examples of compositions made in accordance with this invention are given below. For example, a product suitable for building board results from the use of the sludge material with plaster of Paris, being tougher and less brittle than the latter used alone.

With ordinary glue the paper mill sludge gives a light, hard and tough product, while with sodium silicate, a similar material but not quite so hard is obtained. With both glue and sodium silicate, the sludge gives a tougher product than that obtained with either alone. Starch and sodium silicate with the paper mill sludge gives results similar to those obtained when using plaster of Paris alone. Shellac on the other hand gives a comparatively soft product with the sludge but one that is quite brittle. It will thus be seen that by combining these various materials with paper mill sludge in varying proportions, a product of any desired characteristics can be obtained. Compositions in which shellac, plaster of Paris, sodium silicate, and glue are used as binders will give the best results when the proportion of the binder is the same as that set forth for rubber above.

By the term "paper mill sludge" as used in the claims, we mean the sludge proper which can be made to settle out or can be screened out from the water carrying the sludge, or the equivalent of such sludge material.

This application is filed as a substitute for application No. 521,771 by Hansen and Ruger, entitled Paper sludge composition, filed December 12, 1921.

Having thus set forth our invention, we claim:

1. In a plastic composition, paper mill sludge as an essential component.

2. In a plastic composition, paper mill sludge as a filler.

3. As an article of manufacture, a compressed block of paper mill sludge.

4. A plastic composition comprising paper mill sludge and rubber as a binder for the sludge.

5. A plastic composition comprising from 25 to 75 per cent of rubber and from 75 to 25 per cent of paper mill sludge.

6. A plastic composition comprising from 25 to 33⅓ per cent of rubber and from 75 to 66⅔ per cent of paper mill sludge.

7. As an article of manufacture, a fabricated product containing paper mill sludge and rubber.

8. As an article of manufacture, a boot sole containing paper mill sludge and rubber.

AUGUST E. HANSEN.
ALBERT C. RUGER.